United States Patent Office 3,214,909
Patented Nov. 2, 1965

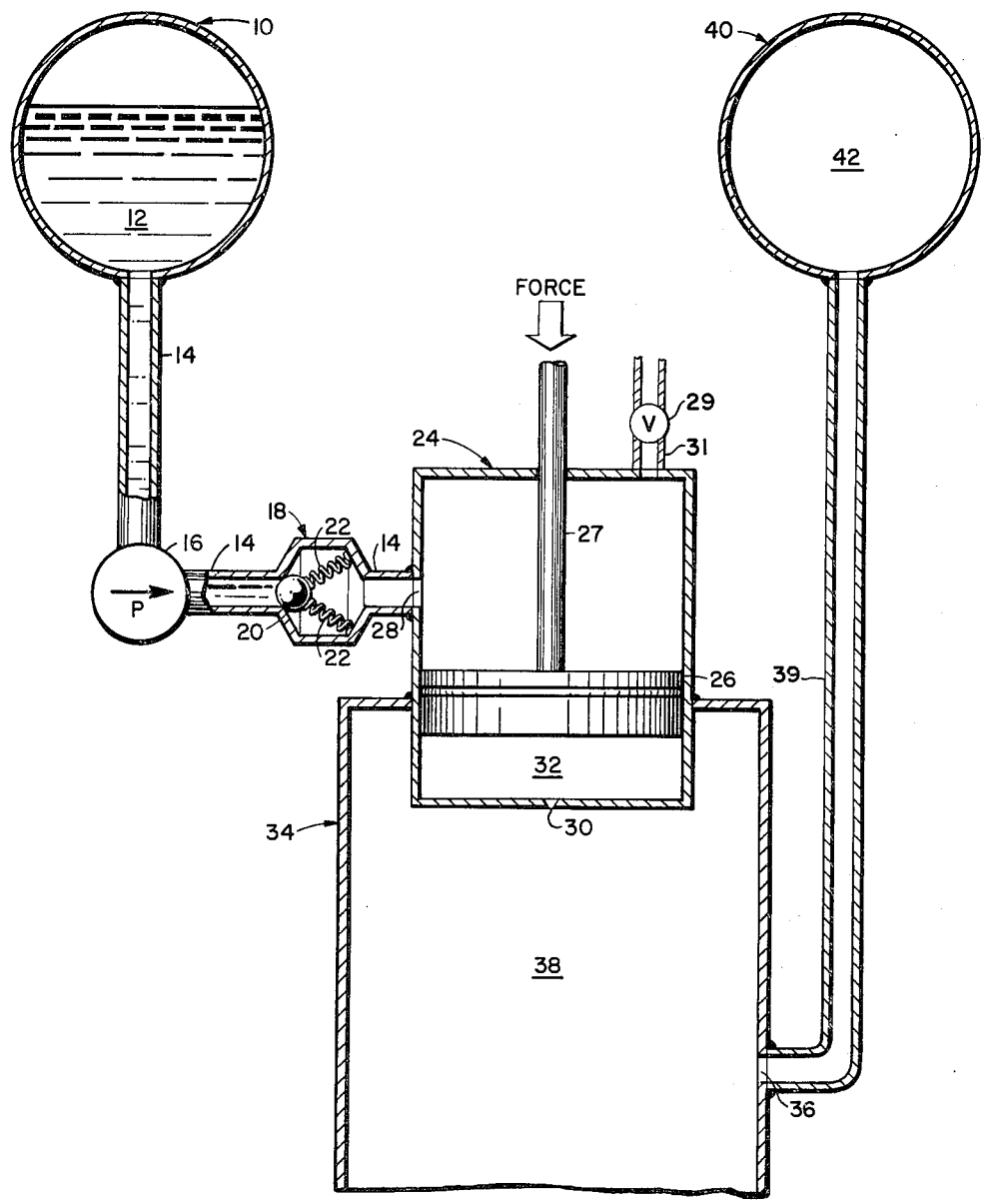

3,214,909
IGNITION SYSTEM
Robert Gordon, Berkley, Calif., assignor to Aerojet-General Corporation, Azusa, Calif., a corporation of Ohio
Filed Apr. 16, 1962, Ser. No. 188,930
6 Claims. (Cl. 60—39.82)

This invention relates to ignition systems generally and to a system for igniting a combustible fluid specifically.

The principal object of this invention is to provide a novel method of and improved means for the ignition of a combustible fluid.

Another object of the present invention is to provide simple and reliable means for ignition of a fuel-oxidizer propellant mixture.

In its principal aspect the present invention comprises a method of igniting a liquid propellant by injection under high pressure and at high velocity into a rocket chamber. The combustible fluid, preferably one which will decompose under heat, is introduced into a chamber where an extremely high pressure is applied to force it from a very small exit orifice at very high velocity into a gaseous medium. Such an orifice is shaped to achieve maximum fluid velocity and to effect the proper distribution of the fluid within the gaseous medium. Aerodynamic friction, shock compression, and shock recompression encountered by the combustile fluid and gaseous medium tend to raise their temperatures to the point where combustion occurs. Where a proper selection of combustible fluid has been made, additional heat is liberated by its decomposition.

These and other objects, aspects, features, and advantages of the present invention will be apparent to those skilled in the art from the following more detailed description taken in conjunction with the appended sole drawing wherein the ignition system of the present invention is incorporated into a liquid propellant rocket motor.

Reference is made to FIGURE 1, a vertical cross-section of the basic arrangement of apparatus for practicing the present invention. A combustible fluid 12 within a tanke 10 is conveyed through a feed line 14 by the action of a pump 16.

Suitable combustible fluids may include either liquid monopropellants or fuels for bipropellant systems. Suitable fuels may include alcohol or gasoline which require gaseous oxidizers such as oxygen or air for ignition. Nitromethane and hydrazine are preferred combustible fluids since they have the properties of both a fuel and monopropellant. Therefore, they may be ignited by being injected into an atmosphere of gaseous oxygen or air, or instead, into an atmosphere of gaseous nitrogen which is not an oxidizer.

A pressure operated check valve 18 having a ball 20 and a pair of springs 22 is arranged in the feed line 14 to control the flow of fluid 12 into a compression cylinder 24. Within the cylinder 24 is located a piston 26 having a drive shaft 27. The piston 26 is made to move back and forth along its longitudinal axis by virtue of the application of a reciprocating force to its shaft 27. A pressure relief valve 29 is arranged on a pressure relief line 31 located on the cylinder 24 behind the piston 26. When the piston 26 is in the uppermost portion of its travel the fluid 12 is allowed to enter the compression cylinder 24 through the intake port 28. As the piston 26 travels downward the check valve 18 seals off the fluid flow as shown in the attached figure. Continued axial motion of the piston 26 forces the fluid 12 within the cylinder 24 into the compression region 32 where it is subjected to pressures of at least 10,000 p.s.i. and preferably 20,000 p.s.i or higher, and is rapidly ejected into the combustion cylinder 34 through an orifice 30. The size and configuration of the orifice 30 is dependent upon the velocity desired and the pressure obtained within the cylinder 24 by the movement of the piston 26. The orifice 30 is preferably held small in order to limit the flow quantities of the fluid 12.

Within the combustion cylinder 34 is a combustion region 38 inhabited by a gaseous medium 42. As mentioned above, the gaseous medium may be oxygen or air when a fuel is used or may be nitrogen when a monopropellant is the combustile fluid. The gaseous medium 42 is stored in tank 40 and passes through line 39 into the cylinder 34 through an intake port 36. The jet of fluid 12 exits into the gaseous medium 42 within the combustion region 38 at an extremely high velocity. The aerodynamic friction, shock compression, and shock recompression encountered by the mixture of fluid 12 and gaseous medium 42 tend to elevate the mixture temperature to the combustion point. Additional benefit may be derived from the use of combustible fluids which decompose under heat such as nitromethane and hydrazine as these release heat upon decomposition. The use of conventional additives does not in any way impair the effieiency of this invention. It has also been found that superior results are achieved by preheating of the combustible fluid. For example, where nitromethane is exhausted into an atmosphere of oxygen or nitrogen, the nitromethane is preferably heated to a temperature of at least 115° Fahrenheit, whereas if it exhausts into an atmosphere of air preheating to at least 85° Fahrenheit is preferable It will be obvious that there are many possible configurations of apparatus which will bring about the results described so long as the general conditions set forth are observed. The essential feature of the present invention is to exit a combustible fluid at sufficiently high pressure and velocity that ignition is achieved in a gaseous medium. Thus, the resulting combustion can be harnessed to provide, among other things, propulsive force in a rocket engine, for a projectile, or to turn a turbine. The fluid compression means may be a piston pump as shown, however, other pressurizing means are equally satisfactory providing they are capable of achieving the injection pressures necessary to effect combustion in the manner described herein.

It is to be understood that the form of the invention herewith shown and described is to be taken as a preferred example of the same and that changes in the shape, size, and arrangement of the part may be resorted to without departing from the spirit of the subjoined claims.

I claim:

1. In combination: a first chamber, means for generating a high pressure within said first chamber, means for introducing a combustible fluid into said first chamber to be compressed to said high pressure, a second chamber within which is maintained a gaseous medium at a lower pressure than the pressure generated within said first chamber, and an orifice connecting said first chamber with said second chamber so that the combustible fluid is removed from said first chamber into said second chamber for expansion into a high velocity stream which is ignited by heat derived from the aerodynamic friction, shock compression and shock recompression associated with the emission of said stream of combustible fluid into said gaseous medium.

2. A fluid ignition system comprising, a compression chamber having an inlet port, a piston located within said chamber, an exhaust orifice located at one end of said chamber, means introducing a fluid fuel into said chamber through said compression chamber inlet port, a combustion chamber having an inlet port, means continuously admitting a gaseous oxidizer atmosphere into said combustion chamber through said combustion chamber inlet port, said combustion chamber being arranged so that said exhaust orifice has an exit leading directly within said combustion chamber, and means for activating said piston along the longitudinal axis of said compression chamber whereby the emission of fluid fuel through said exhaust orifice and into said combustion chamber tends to elevate the temperature of the mixture in the combustion chamber to the point of combustion.

3. A method of igniting nitromethane which comprises heating nitromethane to a temperature of at least 115° Fahrenheit, introducing said nitromethane within a first chamber, generating a pressure of at least 10,000 p.s.i. within said first chamber, introducing a gaseous medium into a second chamber at a pressure very much lower than 10,000 p.s.i., and directing said nitromethane through an orifice in said first chamber into said second chamber whereby the heat derived from the ejection of nitromethane from said first chamber into said second chamber tends to elevate the temperature of the mixture in said second chamber to the combustion point.

4. A method of igniting nitromethane which comprises heating nitromethane to a temperature of at least 115° Fahrenheit, introducing said nitromethane within a first chamber, generating a pressure of at least 10,000 p.s.i. within said first chamber, introducing gaseous nitrogen into a second chamber at a pressure very much lower than 10,000 p.s.i., and directing said nitromethane through an orifice in said first chamber into said second chamber whereby the heat derived from the ejection of nitromethane from said first chamber into said second chamber tends to elevate the temperature of the mixture in said second chamber to the combustion point.

5. A method of igniting nitromethane which comprises heating nitromethane to a temperature of at least 115° Fahrenheit, introducing said nitromethane within a first chamber, generating a pressure of at least 10,000 p.s.i. within said first chamber, introducing gaseous oxygen into a second chamber at a pressure very much lower than 10,000 p.s.i., and directing said nitromethane through an orifice in said first chamber into said second chamber whereby the heat derived from the ejection of nitromethane from said first chamber into said second chamber tends to elevate the temperature of the mixture in said second chamber to the combustion point.

6. A method of igniting nitromethane which comprises heating nitromethane to a temperature of at least 80° Fahrenheit, introducing said nitromethane within a first chamber, generating a pressure of at least 10,000 p.s.i. within said first chamber, introducing air into a second chamber at a pressure very much lower than 10,000 p.s.i., and directing said nitromethane through an orifice in said first chamber into said second chamber whereby the heat derived from the ejection of nitromethane from said first chamber into said second chamber tends to elevate the temperature of the mixture in said second chamber to the combustion point.

References Cited by the Examiner

UNITED STATES PATENTS

| | | |
|---|---|---|
| 1,208,012 | 12/16 | Riotte. |
| 2,500,334 | 3/50 | Zucrow _____ 60—39.46 |
| 2,864,233 | 12/58 | Tschinkel. |
| 2,935,840 | 5/60 | Schoppe _____ 60—39.69 X |
| 3,011,312 | 12/61 | Black _____ 60—39.48 |

FOREIGN PATENTS 27,718 12/09 Great Britain.

DONLEY J. STOCKING, *Primary Examiner.*

JULIUS E. WEST, SAMUEL LEVINE, *Examiners.*